3,517,040
ONIUM SALTS OF BIS-DITHIOCARBAMATE
TRANSITION METAL CHELATES
Sheldon N. Lewis, Willow Grove, and George A. Miller, Glenside, Pa., assignors to Rohm & Haas Company, Philadelphia, Pa., a corporation of Delaware
No Drawing. Filed Dec. 2, 1966, Ser. No. 598,599
Int. Cl. C07j 3/06, 3/08, 15/04
U.S. Cl. 260—429
18 Claims

ABSTRACT OF THE DISCLOSURE

This invention is concerned with new compositions of matter which are metal chelates of ammonium and phosphonium salts of alkylene and phenylene bis-dithiocarbamates. They conform to the general structure

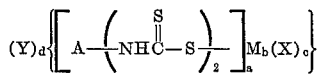

wherein Y stand for certain defined ammonium and phosphonium groups,
A is alkylene or phenylene,
M is at least one of cadmium, cobalt, copper, iron, manganese, nickel and zinc ions,
X is an anion which complexes with the metal M and
$a$, $b$, $c$ and $d$ are integers.

The invention also includes a novel process for the preparation of these onium salts of bis-dithiocarbamate transition metal chelates, agricultural compositions containing them, and their use for the control of plant diseases, particularly fungal diseases.

This invention is concerned with ammonium and phosphonium salts of alkylene and phenylene bis-dithiocarbamate transition metal chelates as new compositions of matter. Further, this invention is concerned with a novel process for the preparation of ammonium and phosphonium salts of alkylene and phenylene bis-dithiocarbamate transition metal chelates. Further, still, this invention relates to agricultural compositions containing as the active ingredient therein these ammonium and phosphonium salts of alkylene and phenylene bis-dithiocarbamate transition metal chelates. Still further, this invention relates to a method for controlling diseases of agricultural plants.

BACKGROUND OF THE INVENTION

Due to the continually increasing population and resultant demand for greater quantities of high quality food throughout the world, substantial amounts of time and money have been expended by researchers seeking to develop means for meeting these enlarged requirements. More food is usually made available by proceeding in either of two ways. The first involves increased planting and cultivation with the subsequently enlarged production which would be expected to result therefrom. The second method which is somewhat related to the first involves improving the yield of cultivated crops. As would be expected, it is the second method which has been the primary concern of the chemical industry.

Foremost in retarding the yield of crops under cultivation, and at times their total food value, has been their subjectivity to attack by noxious microorganisms, such as fungi and bacteria. Persistent experimentation being motivated by the desire to find a means for the effective control of these microorganisms has culminated in the discovery of this invention.

The novel compounds disclosed herein have exhibited outstanding biocidal properties and have proven to be especially effective against a wide variety of fungi and bacteria which are harmful to many crops. As is necessary for an acceptable agricultural biocide, the compounds of the present invention have not exhibited any substantial phytotoxic effect on the agricultural plants while demonstrating exceptional control of noxious microorganisms. Because of their outstanding success in this respect, the compounds and processes of this invention represent an important step forward in the science of agricultural pesticides.

Although there are extensive literature citations, both patent and otherwise, dealing with ethylene bis-dithiocarbamates and the like, there are very few references which are in any way related to the novel onium salts of alkylene bis-dithiocarbamate transition metal chelates disclosed herein. Typical of these related literature references are U.S. Pat. 2,973,297 granted to Bakkeren et al. and German Pat. 1,057,814. Bakkeren deals with quaternary ammonium salts of dithiocarbamic acids, such as cetyl pyridinium dimethyldithiocarbamate and cetyl pyridinium ethylenebisdithiocarbamate, which are employed in fungicidal compositions. German Pat. 1,057,814, on the other hand, describes a complex zinc-amine salt of bis-dithiocarbamic acid. It is also known from U.S. Pat. 2,855,418 that ammonium ethylenebisdithiocarbamate will react with heavy metal salts to form the corresponding ethylenebisdithiocarbamates. These cited patents are noted at this point to indicate the state of the art, but as will be evident, they do not describe or even suggest an onium salt of the type described in this application.

SUMMARY OF THE INVENTION

By way of brevity, the ammonium and phosphonium salts of alkylene and phenylene bis-dithiocarbamate transition metal chelates of this invention will be referred to hereinafter at times as "onium metal chelates." In all events, either of these terms will refer to the compound represented by the formula

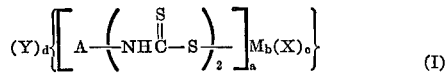  (I)

wherein A is an alkylene chain of 2 to 6 carbon atoms, a lower alkyl substituted alkylene chain of 2 to 6 carbon atoms, or phenylene;
$a$ is the integer 2 or 4;
M is at least one of Cd; Co, Cu, Fe, Mn, Ni, or Zn;
$b$ is the integer 1, 3 or 4;
X is an anion which complexes with the metal M;
$c$ is an integer from 0 to 4;
Y is morpholinium, imidazolium, 2-lower alkyl imidazolium, 1-(2-hydroxyethyl)-2-N-alkylcarbamoylimidazozolinium wherein the alkyl is 1 to 24 carbon atoms, N-lower alkyl pyridinium, alkylenediammonium wherein the alkylene is 2 to 6 carbon atoms, the group

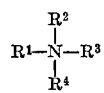

wherein $R^1$, $R^2$, $R^3$ and $R^4$ represent individually alkyl of 1 to 24 carbon atoms, cyclohexyl, aryl, benzyl, alkyl substituted benzyl wherein the alkyl is 1 to 12 carbon atoms, hydroxyalkyl of 1 to 4 carbon atoms, or hydrogen except that when $R^1$, $R^2$ and $R^3$ each represent hydrogen, $R^4$ must be group other than hydrogen or methyl; the group

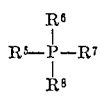

wherein $R^5$, $R^6$, $R^7$ and $R^8$ represent, individually, alkyl of 1 to 24 carbon atoms, monoalkylamino and dialkylamino groups wherein the alkyl radicals contain from 1 to 24 carbon atoms, phenyl, benzyl and alkyl substituted benzyl wherein the alkyl is 1 to 12 carbon atoms, and $d$ is an integer from 1 to 4.

Lower alkyl, as employed in the preceding definition of the compounds of this invention is intended to indicate an alkyl group having 1 to 6 carbon atoms. Typical alkyls within this definition include methyl, ethyl, propyl, isopropyl, butyl, tert-butyl, 2-methylbutyl, sec-pentyl, 1,1-dimethylbutyl or hexyl. Most of the common anions (X) will complex with the metals (M). Typical X groups are the halides, cyano, thiocyano, nitrate, sulfate, phosphate, acetate and oxalate. X is preferably a halide or mixture of halides.

Preparation of the novel onium metal chelates (I) involves a process which comprises reacting a solution of a transition metal salt (1) with an alkylene bis-dithiocarbamic alkali metal salt (2) in the presence of at least 0.5 molar equivalent of an onium salt or halide, Y(X) (3). Typical onium salts would include fluoborate, phosphates, sulfates, nitrates and the like. The onium halides are preferred. Typical metal salts are the halides, acetate, nitrate, phosphate and sulfate. It is preferred that the metal ions be divalent except for iron in which case the ferric form is preferred.

The reaction can be illustrated by the following schematic equation:

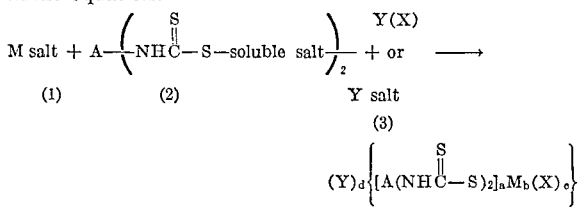

wherein the symbols A, M, X, Y, $a$, $b$, $c$ and $d$ are as previously represented. By soluble salt is meant one which has enough solubility in the reaction mixture for the reaction to occur. The preferred soluble salts are those of the alkali metals.

Usually and preferably, this reaction is carried out in water solution; however, solvents such as methanol, ethanol, isopropanol and the like can also be utilized. There are instances where the ammonium or phosphonium salt has limited solubility in water and for these it is preferable to dissolve the onium salt in an appropriate solvent, such as alcoholic solvents, for addition to the bis-dithiocarbamate. It is preferred to have the bis-dithiocarbamate onium salt mixture in solution before addition of the metal salt. In certain situations, it may be desirable to effect the reaction in a solvent such as dimethylsulfoxide and then add sufficient water so as to precipitate the onium metal chelates therefrom. Numerous modifications and variations evident to one skilled in the art may be employed within the general concept of the subject process. For example, certain amine hydrochlorides are liquid at room temperature. Where such an amine hydrochloride is used for the Y salt, an excess of this material may be used as the reaction medium either by itself or in conjunction with a small amount of an additional solvent too promote the requisite solubility of the other reactants. Any and all such deviations, are, of course, encompassed within the scope of this invention.

The formation of the onium metal chelates proceeds satisfactorily at temperatures in the range of 0–50° C. A reactant solution temperature maintained in the range of 20° to 30° C. is preferred. Higher temperatures may be used but at these higher temperatures the bis-dithiocarbamaet solutions are subject to decomposition, which lowers yield of the desired product.

The amount of onium salt reactant used, based on the bis-dithiocarbamate reactant, varies with the type of product desired. In the instances where there is no (X) in the structure, i.e. where $c$ equals O, the theoretical amount of onium salt based on the bis-dithiocarbamate is one-half mole equivalent. In those cases where a halogen (X)$_2$ is present in the product a molar equivalent is the theoretical quantity. Excess reagents may be used.

The most usual product formed corresponds to the structure

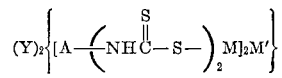

wherein symbols A, M and Y have the previously defined meanings and M' may be the same as M or may be a different metal ion selected from the same group as M.

In order to obtain these products, the theoretical amount of metal salts used based on the bis-dithiocarbamate is three-fourths molar equivalent. Mixtures of metal salts may be used and the same theoretical quantity of the metal salt combination applies. Excesses of the metal salt reactant based on the bis-dithiocarbamate may be used and the excess amount is governed by economic and other considerations. For example, excesses of metal salt such as copper sulfate or nickel sulfate can be used. The use of such excess metal salts will result in a mixture of a product of the invention with unused metal salt. An excess of copper sulfate is useful for application to grapes and similar crops while the mixture with excess nickel sulfate may be applied to cereal grains.

This formula does not indicate an exact chemical structure by any means; however, it is believed that the metal is present in two main types of bondings. Primarily the metal forms an ionic bond with the bis-dithiocarbamate radical and secondarily the metal forms a complex, chelate or coordinate bond with thiocarbamyl groups. These two types of bondings have different energy levels and the different metals have different salt-forming and complexing abilities. It is possible to form onium metal complexes according to the invention wherein the same metal is present in both bonding forms or to form compounds wherein different metals are used for each of the two types of bonding in the same compound.

In the case of manganese salts products are isolated which correspond to the structure

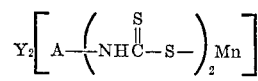

In the case of ferric salts products are formed which correspond to the structure

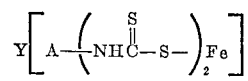

Accordingly, for this type of onium metal chelate, the theoretical amount of ferric and manganese salt is one-half molar equivalent based on the bis-dithiocarbamate.

It was found that when ammonium salts, i.e. $NH_4^-$ salts, were used, an onium metal chelate did not form, but only the metal bis-dithiocarbamate was obtained. When monomethylammonium salts, i.e. $CH_3NH_3^-$ salts, were tried in the reaction, a mixture of metal bis-dithiocarbamate and onium metal chelate was obtained.

The concentration of the solution of the combined bis-dithiocarbamate and onium salt is limited only by the solubility of these reactants in the reaction solvent. Satisfactory results have been obtained wherein the concentration of solids has been varied from 2% to 35%.

Completion of the reaction is indicated by formation of a precipitate which constitutes the product being prepared. This precipitate may be recovered from the reaction solution by means well known to one skilled in the art. Typically, this will involve filtration and then drying at elevated temperatures in vacuum. Yields of 90 to 100% of theoretical are normally so obtained. In addition to filtration, means such as centrifugation, settling with subsequent pouring-off of the supernatant liquid and the like are also easily utilized.

Numerous modifications and variations evident to one skilled in the art may be employed within the general concept of the subject process. Any and all such deviations are, of course, encompassed within the scope of this invention.

By way of illustration and not by way of limitation, several embodiments of this invention have been prepared in accordance with the above disclosed process. Specific preparations hereinafter following are presented for Examples 1 through 5, 36, 44, 48 and 52 so as to more fully demonstrate the process for the preparation of the onium metal chelates along with the compounds themselves.

EXAMPLE 1

Preparation of dimethylammonium zinc ethylene-bis-dithiocarbamate chelate

A 40% dimethylamine solution (20.2 g., 0.1 mole) was diluted with 100 ml. of water and neutralized to pH 7 by the addition of approximately 10 g. of concentrated hydrochloric acid. To this solution was then added 56.8 g. (0.05 mole) of 32% aqueous disodium ethylene-bis-dithiocarbamate hexahydrate. The resulting orange solution was treated dropwise at 25° C. over 20 minutes with a solution of 5.1 g. (0.0375 mole) of zinc chloride in 20 ml. of water. A white solid precipitated, which was filtered and dried at 40° C. under 10–20 mm. vacuum. In this manner, 13.1 g. of dimethylammonium zinc ethylene-bis-dithiocarbamate chelate was obtained which constituted a 92% yield.

The product may be depicted by the following structure:

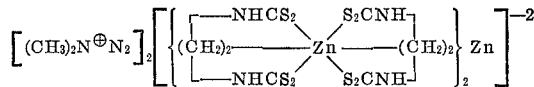

EXAMPLE 2

Preparation of tetramethylammonium zinc ethylene-bis-dithiocarbamate chelate

To a solution of 123 g. (0.8 mole) of tetramethylammonium bromide in 1500 ml. of water was added 454 g. (0.4 mole) of 32% aqueous disodium ethylene-bis-dithiocarbamate hexahydrate. The resulting orange solution was treated dropwise at 25° C. over 30 minutes with 66 g. (0.3 mole) of zinc acetate dihydrate in 250 ml. of water. A white precipitate was filtered off and dried at 50° C. under 10–20 mm. vacuum. In this manner, 123 g. of tetramethylammonium zinc ethylene-bis-dithiocarbamate chelate was obtained.

EXAMPLE 3

Preparation of choline zinc ethylene-bis-dithiocarbamate chelate

Anhydrous disodium ethylene-bis-dithiocarbamate, 51 g. (0.2 mole), and choline chloride, 13.9 g. (0.1 mole), were dissolved in 78 ml. of water. This solution was then treated at 25° C. over 5 minutes with 20.4 g. (0.15 mole) of zinc chloride in 20 ml. of water. The reaction mixture was stirred over 20 minutes during which time the temperature rose to 40° C. and the mixture appearance changed from a slightly greenish slime to a white, creamy slurry. The slurry was stirred for 12 hours, then filtered, and the white solid precipitate was washed with 100 ml. of water. The solid was dried under 10–20 mm. vacuum at 40–50° C. to yield 56.8 g. (92%) of choline zinc ethylene-bis-dithiocarbamate chelate.

EXAMPLE 4

Preparation of choline copper ethylene-bis-dithiocarbamate chelate

Choline chloride, 55.6 g. (0.4 mole), was dissolved in 750 ml. of water and 51.2 g. (0.2 mole) of anhydrous disodium ethylene-bis-dithiocarbamate was added. The resulting orange solution was treated dropwise at 25° C. over 30 minutes with 37.4 g. (0.150 mole) of copper sulfate pentahydrate in 100 ml. of water. The brown precipitate which formed was filtered off and dried at 40–50° C. under 10–20 mm. vacuum to yield 54 g. (87%) of solid choline copper ethylene-bis-dithiocarbamate chelate.

EXAMPLE 5

Preparation of tetrabutylammonium nickel ethylene-bis-dithiocarbamate chelate

Sodium hydride (67% in mineral oil), 3.9 g. (0.11 mole), was placed in a flame dried flask and washed with 3×50 ml. of xylene. The washed hydride was then covered with 100 ml. of distilled dimethylsulfoxide. Ethylenediamine (3.0 g., 0.05 mole) was added, and the solution was then treated dropwise with cooling to 20–25° C. over 30 minutes with 7.6 g. (0.1 mole) of carbon disulfide. A total of 2.17 liters of hydrogen was evolved. The resulting solution of disodium ethylene-bis-dithiocarbamate was treated with 9.3 g. (0.0375 mole) of nickel acetate tetrahydrate to yield a very dark solution. To this solution was added 8.0 g. (0.025 mole) of tetrabutylammonium bromide, and the reaction was stirred for 4 hours. The dimethylsulfoxide solution was then poured into 1500 ml. of water to give a brown solid precipitate. The product was collected by filtration and dried at 25° C. under 10–20 mm. to yield 17 g. (91%) of solid tetrabutylammonium nickel ethylene-bis-dithiocarbamate chelate.

The above examples are typical of those in which four units of bis-dithiocarbamate, two ammonium units and three metal units are combined into the onium metal chelate structures. In Table I, Examples 1–3 are of this type.

EXAMPLE 36

Preparation of tetrabutylammonium zinc hexamethylene-bis-dithiocarbamate chelate A solution of disodium hexamethylene-bis-dithiocarbamate was prepared in the following manner. Sodium hydroxide, 8 g. (0.2 mole) was dissolved in 100 ml. of water, and then under nitrogen at 20° C. was added 11.6 g. (0.1 mole) of 1,6-diaminohexane. This solution was then treated at 20° C. dropwise with 15.2 g. (0.2 mole) of carbon disulfide, and an orange coloration developed. Twenty-five milliliters of ethanol was added to give a homogeneous system and stirring was continued for 2.5 hours to complete the reaction.

The disodium hexamethylene-bis-dithiocarbamate prepared above was treated with 64.4 g. (0.2 mole) of tetrabutylammonium bromide in 100 ml. of water. To the resulting solution was added at 25° C. over 30 minutes 16.4 g. (0.075 mole) of zinc acetate dihydrate dissolved in 100 ml. of water. The white precipitate which formed was then filtered off, washed with water, and dried at 10–20 mm. and 40–50° C. to give 53.5 g. (90% yield) of solid tetrabutylammonium zinc hexamethylene-bis-dithiocarbamate chelate. This product may be depicted by the following structure:

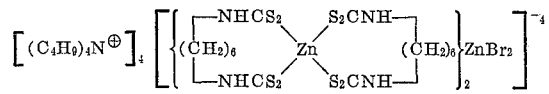

This preparation is typical of ones in which the anion (X) is incorporated into the structures. In Table I, Examples 36–43 are of this type.

EXAMPLE 44

Preparation of benzyltrimethylammonium manganese ethylene-bis-dithiocarbamate chelate A 35% methanolic solution of benzyltrimethylammonium hydroxide (23.8 g., 0.05 mole) was diluted with 100 ml. of water and neutralized to pH 7 with a 42% aqueous solution of fluoboric acid. To this solution was then added 28.2 g. (0.025 mole) of 32% aqueous disodium ethylene-bis-dithiocarbamate. To the resulting solution was then added dropwise at 25° C. over a period of 30 minutes 3.0 g. (0.0125 mole) of manganese acetate tetrahydrate dissolved in 50 ml. of water. A tan solid precipitated and was filtered off and dried at 25° C. and 1 mm. (Hg) pressure. In this manner, 8.2 g. (85% yield) of benzyltrimethylammonium manganese ethylene-bis-dithiocarbamate chelate was obtained.

This product may be depicted by the following structure:

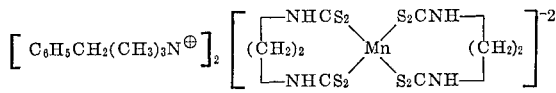

This exemplifies the type of quaternary ammonium metal chelate wherein two bis-dithiocarbamate units, two quaternary units and one metal ion are combined. In Table I, Examples 44–47 are of this type.

EXAMPLE 48

Preparation of N,N',N'',N'''-tetrakis-(1,1,3,3-tetramethylbutylamino)phosphonium zinc ethylene-bis-dithiocarbamate (a 1,1,3,3-tetramethylbutyl group is often referred to as t-octyl)

To a solution of 29 g. (0.05 mole) of N,N',N'',N'''-tetrakis - (1,1,3,3 - tetramethylbutylamino)phosphonium chloride in 500 ml. of methanol was added 28.3 g. (0.025 mole) of 32% aqueous disodium ethylenebisdithiocarbamate hexahydrate. To the stirred solution was added 3.45 g. (0.0187 mole) of anhydrous zinc acetate in 75 ml. of methanol plus 5 ml. of water. A slightly yellow gum precipitated and was removed and dried under vacuum to give an orange foam-like solid. The solid was allowed to soak under water for one week and was then filtered off and dried to give 12.8 g. (97% yield) of a slightly tan solid.

The product may be depicted by the following structure:

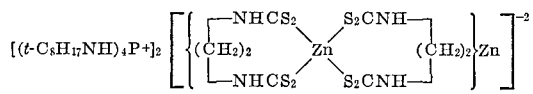

Examples 49 and 51 are further examples of the compounds of this invention made from typical quaternary phosphonium compounds. These are included in Table I.

EXAMPLE 52

Preparation of tetramethylammonium manganese-zinc ethylene-bis-dithiocarbamate chelate Tetramethylammonium hydroxide (146 g. 0.4 mole) was neutralized to pH 7 with 0.4 mole of concentrated hydrochloric acid and then diluted with 700 ml. of water. To this solution was added 227 g. (0.2 mole) of 32% aqueous disodium ethylene-bis-dithiocarbamate hexahydrate. The resulting aqueous solution was blanketed with nitrogen and there was then added dropwise over a period of 30 minutes a solution of manganeous sulfate monohydrate (25.4 g., 0.15 mole) in 200 ml. of water. A precipitate formed. The mixture was stirred for 15 minutes. A sample of the product at this point was somewhat unstable and decomposed upon drying. To the main reaction mixture was then added 27.2 g. (0.2 mole) of zinc chloride in 100 ml. of water, over a period of 30 minutes. The resulting solid was filtered off, washed with water and dried to give 53.8 g. of light brown solid.

This is typical of a method of preparation in which two or more metals may be incorporated into the onium metal chelate structures. Examples 52–54 are of this type.

In this example the mixed metal onium compound was prepared by carrying out the reaction in successive stages. If desired, mixed metal onium compounds may also be prepared by adding the two metal salts at the same time.

Table I catalogues the substituents of al lthe axmples; namely 1 through 54 along with the decomposition point of the preparations. Following Table I, there is presented in Table II the empirical formula of each example and its corresponding analytical data, both calculated and determined.

TABLE I.—EXAMPLE SUBSTITUENTS

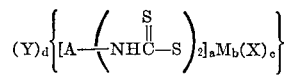

| Ex. No. | A | a | Y | d | X | c | M | b | Decomposition Point (° C.) |
|---|---|---|---|---|---|---|---|---|---|
| 1 | (—CH₂—)₂ | 4 | (CH₃)₂NH₂ | 2 | | | Zn | 3 | 140–45 |
| 2 | (—CH₂—)₂ | 4 | (CH₃)₄N | 2 | | | Zn | 3 | 149–50 |
| 3 | (—CH₂—)₂ | 4 | (CH₃)₃NCH₂CH₂OH | 2 | | | Zn | 3 | 132–33 |
| 4 | (—CH₂—)₂ | 4 | (CH₃)₃NCH₂CH₂OH | 2 | | | Cu | 3 | 122–25 |
| 5 | (—CH₂—)₂ | 4 | (C₄H₉)₄N | 2 | | | Ni | 3 | 119 |
| 6 | (—CH₂—)₂ | 4 | (CH₃)₃NH | 2 | | | Zn | 3 | 118–25 |
| 7 | (—CH₂—)₂ | 4 | t-C₄H₉NH₃ | 2 | | | Zn | 3 | 220–40 |
| 8 | (—CH₂—)₂ | 4 | t-C₈H₁₇NH₃ | 2 | | | Zn | 3 | 125 |
| 9 | (—CH₂—)₂ | 4 | t-C₁₈H₃₇NH₃ | 2 | | | Zn | 3 | 120–27 |
| 10 | (—CH₂—)₂ | 4 | (HOCH₂CH₂)₂NH₂ | 2 | | | Zn | 3 | 130–60 |
| 11 | (—CH₂—)₂ | 4 | (HOCH₂CH₂)₃NH | 2 | | | Zn | 3 | 115 |
| 12 | (—CH₂—)₂ | 4 | (HOCH₂CH₂)₄N | 2 | | | Zn | 3 | 96–103 |
| 13 | (—CH₂—)₂ | 4 | C₆H₅NH₃ | 2 | | | Zn | 3 | 135–50 |
| 14 | (—CH₂—)₂ | 4 | C₆H₅NH₂C₂H₅ | 2 | | | Zn | 3 | 132 |
| 15 | (—CH₂—)₂ | 4 | (—CH₂NH₃)₂ | 1 | | | Zn | 3 | 200–20 |
| 16 | (—CH₂—)₂ | 4 | (morpholine-NH₂) | 2 | | | Zn | 3 | 158–60 |
| 17 | (—CH₂—)₂ | 4 | (imidazole, CH₃) | 2 | | | Zn | 3 | 148 |

TABLE I.—Continued

| Ex. No. | A | a | Y | d | X | c | M | b | Decomposition Point (° C.) |
|---|---|---|---|---|---|---|---|---|---|
| 18 | (—CH₂—)₂ | 4 | CONHC₁₈H₃₇-t, imidazoline with CH₂CH₂OH | 2 | | | Zn | 3 | 127–30 |
| 19 | (—CH₂—)₂ | 4 | C₅H₅N-CH₃ (pyridinium) | 2 | | | Zn | 3 | 123–25 |
| 20 | (—CH₂—)₂ | 4 | C₁₈H₃₇N(CH₃)₂CH₂C₆H₅ | 2 | | | Zn | 3 | 109–11 |
| 21 | (—CH₂—)₂ | 4 | (C₄H₉)₄N | 2 | | | Zn | 3 | 123–29 |
| 22 | C₆H₄ (phenylene) | 4 | (C₄H₉)₄N | 2 | | | Zn | 3 | 220 |
| 23 | (—CH₂—)₂ | 4 | CONHC₁₈H₃₇-t, imidazoline with CH₂CH₂OH | 2 | | | Cu | 3 | 105–10 |
| 24 | (—CH₂—)₂ | 4 | (CH₃)₃NCH₂C₆H₅ | 2 | | | Cu | 3 | 115–18 |
| 25 | (—CH₂—)₂ | 4 | (CH₃)₃NCH₂C₆H₅ | 2 | | | Ni | 3 | 143 |
| 26 | (—CH₂—)₂ | 4 | (C₃H₇)₄N | 2 | | | Zn | 3 | 113 |
| 27 | (—CH₂—)₂ | 4 | (CH₃)₃NCH₂C₆H₅ | 2 | | | Zn | 2 | 125–30 |
| 28 | (—CH₂—)₂ | 4 | (C₄H₉)₄N | 2 | | | Zn | 3 | 120 |
| 29 | (—CH₂—)₂ | 4 | (C₄H₉)₄N | 2 | | | Ni | 3 | 155 |
| 30 | (—CH₂—)₂ | 4 | (C₄H₉)₄N | 2 | | | Cu | 3 | 107 |
| 31 | (—CH₂—)₂ | 4 | (CH₃)₃NCH₂CH₂OH | 2 | | | Mn | 3 | 158–62 |
| 32 | (—CH₂—)₂ | 4 | (CH₃)₄N | 2 | | | Mn | 3 | 162–65 |
| 33 | (—CH₂—)₃ | 4 | (CH₃)₄N | 2 | | | Zn | 3 | 171–75 |
| 34 | (—CH₂—)₂ | 4 | (CH₃)₄N | 2 | | | Cd | 3 | 159 |
| 35 | (—CH₂—)₂ | 4 | (CH₃)₄N | 2 | | | Co | 3 | >250 |
| 36 | (CH₂—)₆ | 4 | (C₄H₉)₄N | 4 | Br | 2 | Zn | 3 | 100–10 |
| 37 | (—CH₂—)₂ | 4 | (C₄H₉)₄N | 4 | Br | 2 | Zn | 3 | 115 |
| 38 | (—CH₂—)₂ | 4 | (C₃H₇)₄N | 4 | I | 2 | Zn | 3 | 124 |
| 39 | (—CH₂—)₂ | 4 | (CH₃)₃NCH₂C₆H₅ | 4 | Cl | 2 | Zn | 3 | ¹103 |
| 40 | (—CH₂—)₂ | 4 | (CH₃)₃NCH₂C₆H₅ | 4 | Cl | 4 | Zn | 4 | 125–29 |
| 41 | —CH₂—CH(CH₃)— | 4 | (C₄H₉)₄N | 4 | Br | 2 | Zn | 3 | 110 |
| 42 | (—CH₂—)₂ | 4 | (C₄H₉)₄N | 4 | Br | 2 | Cu | 3 | 150 |
| 43 | (—CH₂—)₂ | 4 | (C₄H₉)₄N | 4 | Br | 2 | Ni | 3 | 150 |
| 44 | (—CH₂—)₂ | 2 | (CH₃)₃NCH₂C₆H₅ | 2 | | | Mn | 1 | ¹143 |
| 45 | (—CH₂—)₂ | 2 | (CH₃)₃NCH₂C₆H₅ | 2 | | | Mn | 1 | ²95 |
| 46 | (—CH₂—)₂ | 2 | (CH₃)₃NCH₂C₆H₅ | 1 | | | Fe⁺⁺⁺ | 1 | ¹146 |
| 47 | (—CH₂—)₂ | 2 | (CH₃)₃NCH₂C₆H₅ | 1 | | | Fe⁺⁺⁺ | 1 | ²177 |
| 48 | (—CH₂—)₂ | 4 | (t-C₈H₁₇NH)₄P | 2 | | | Zn | 3 | 110 |
| 49 | (—CH₂—)₂ | 4 | C₆H₅(C₁₈H₃₇)P[N(CH₃)₂]₂ | 2 | | | Zn | 3 | 115–20 |
| 50 | (—CH₂—)₂ | 4 | C₆H₅(C₁₂H₂₅C₆H₄CH₂)P(NHC₄H₉)₂ | 2 | | | Zn | 3 | 115–30 |
| 51 | (—CH₂—)₂ | 4 | (C₆H₅)₃CH₃P | 4 | Cl | 2 | Zn | 3 | 124–27 |
| 52 | (—CH₂—)₂ | 4 | (CH₃)₄N | 2 | | | Mn-Zn | 3 | 165–68 |
| 53 | (—CH₂—)₂ | 4 | HOCH₂CH₂N(CH₃)₃ | 2 | | | Mn-Zn | 3 | 162–65 |
| 54 | (—CH₂—)₂ | 4 | HOCH₂CH₂N(CH₃)₃ | 2 | | | Ni-Zn | 3 | 165–80 |

¹ Made from the quaternary ammonium chloride.
² Made from the quaternary ammonium fluoborate.

TABLE II

| Ex. No. | Empirical Formula | C | H | N | S | Halogen or Phosphorus | Metal |
|---|---|---|---|---|---|---|---|
| 1 | $C_{20}H_{40}N_{10}S_{16}Zn_3$ | 20.30 (21.3) | 3.54 (3.5) | 11.75 (12.4) | 43.49 (45.4) | | Zn, 18.00 (17.3). |
| 2 | $C_{24}H_{48}N_{10}S_{16}Zn_3$ | 23.80 (24.4) | 3.54 (4.1) | 11.06 (11.85) | 40.94 (43.2) | | Zn, 16.80 (16.5). |
| 3 | $C_{26}H_{52}N_{10}O_2S_{16}Zn_3$ | 25.17 (25.1) | 4.40 (4.2) | 11.05 (11.25) | 38.25 (41.15) | | Zn, 16.08 (15.75). |
| 4 | $C_{26}H_{52}N_{10}O_2S_{16}Cu_3$ | 23.65 (25.2) | 4.40 (4.2) | 10.22 (11.3) | 35.71 (41.4) | | Cu, 16.60 (15.3). |
| 5 | $C_{48}H_{96}N_{10}S_{16}Ni_3$ | 41.57 (38.4) | 6.40 (6.4) | 6.38 (9.30) | 29.98 (34.2) | | Ni, 11.24 (11.7). |
| 6 | $C_{22}H_{44}N_{10}S_{16}Zn_3$ | 21.97 (22.8) | 4.39 (3.8) | 11.37 (12.1) | 42.77 (44.3) | | Zn, 17.69 (16.9). |
| 7 | $C_{24}H_{48}N_{10}S_{16}Zn_3$ | 21.01 (24.3) | 3.71 (4.1) | 10.54 (11.85) | 43.33 (43.2) | | Zn, 21.16 (16.5). |
| 8 | $C_{32}H_{64}N_{10}S_{16}Zn_3$ | 31.81 (29.6) | 5.53 (4.9) | 10.68 (10.7) | 37.45 (39.6) | | Zn, 13.83 (15.0). |
| 9 | $C_{52}H_{104}N_{10}S_{16}Zn_3$ | 40.00 (29.6) | 7.20 (6.6) | 8.74 (8.9) | 30.88 (32.5) | | Zn, 12.79 (12.4). |
| 10 | $C_{24}H_{48}N_{12}O_4S_{16}Zn_3$ | 22.14 (22.6) | 3.60 (3.8) | 11.72 (13.2) | 41.00 (40.1) | | Zn, 18.90 (15.3). |
| 11 | $C_{28}H_{56}N_{10}OS_{16}Zn_3$ | 25.37 (25.1) | 4.15 (4.2) | 10.64 (10.5) | 38.24 (38.4) | | Zn, 15.40 (14.6). |
| 12 | $C_{32}H_{64}N_{10}O_8S_{16}Zn_3$ | 26.90 (27.0) | 4.51 (4.5) | 9.77 (9.9) | 35.00 (36.1) | | Zn, 13.59 (13.7). |
| 13 | $C_{28}H_{40}N_{10}S_{16}Zn_3$ | 25.01 (27.5) | 4.05 (3.3) | 12.69 (11.4) | 41.60 (41.8) | | Zn, 16.50 (15.9). |
| 14 | $C_{32}H_{48}N_{10}S_{16}Zn_3$ | 30.28 (30.0) | 4.20 (3.8) | 11.60 (11.0) | 37.23 (40.0) | | Zn, 13.70 (15.2). |
| 15 | $C_{18}H_{32}N_{10}S_{16}Zn_3$ | 19.62 (19.7) | 3.46 (2.9) | 11.37 (8.17) | 43.31 (46.8) | | Zn, 18.50 (17.8). |
| 16 | $C_{24}H_{44}N_{10}O_2S_{16}Zn_3$ | 26.70 (23.8) | 4.15 (3.6) | 11.55 (11.5) | 40.94 (42.3) | | Zn, 15.50 (16.1). |
| 17 | $C_{24}H_{38}N_{12}S_{16}Zn_3$ | 24.61 (24.0) | 3.69 (3.1) | 14.09 (14.0) | 33.40 (42.6) | | Zn, 17.8 (61.2). |
| 18 | $C_{68}H_{126}N_{14}O_4S_{16}Zn_3$ | 41.41 (43.8) | 6.73 (6.7) | 10.44 (10.3) | 25.38 (27.0) | | Zn, 10.01 (10.3). |
| 19 | $C_{28}H_{40}N_{10}S_{16}Zn_3$ | 27.20 (27.4) | 3.33 (3.3) | 10.69 (11.4) | 38.07 (41.85) | | Zn, 14.72 (16.0). |
| 20 | $C_{70}H_{124}N_{10}S_{16}Zn_3$ | 57.65 (46.3) | 8.78 (6.9) | 7.83 (7.7) | 20.54 (28.3) | | Zn, 7.60 (10.8). |
| 21 | $C_{48}H_{96}N_{10}S_{16}Zn_3$ | 36.93 (37.8) | 6.58 (6.36) | 7.53 (9.21) | 32.24 (33.7) | | Zn, 13.39 (12.9). |
| 22 | $C_{64}H_{96}N_{10}S_{16}Zn_3$ | 51.83 (44.8) | 7.25 (5.64) | 9.41 (8.17) | 17.28 (29.9) | | Zn, 13.64 (11.4). |
| 23 | $C_{68}H_{126}N_{14}O_4S_{16}Cu_3$ | 40.80 (42.8) | 6.48 (6.6) | 9.83 (10.3) | 24.65 (26.8) | | Cu, 12.80 (10.0). |
| 24 | $C_{36}H_{56}N_{10}S_{16}Cu_3$ | 32.98 (32.5) | 4.11 (4.2) | 9.60 (10.5) | 30.36 (38.6) | | Cu, 15.36 (14.3). |

TABLE II—Continued

| Ex. No. | Empirical Formula | Analysis [1] | | | | Halogen or Phosphorus | Metal |
|---|---|---|---|---|---|---|---|
| | | C | H | N | S | | |
| 25 | $C_{36}H_{56}N_{10}S_{16}Ni_3$ | 32.46 (32.8) | 4.02 (4.3) | 9.41 (10.6) | 31.04 (38.9) | | Ni, 5.14 (13.36). |
| 26 | $C_{40}H_{80}N_{10}S_{16}Zn_3$ | 37.39 (34.1) | 7.58 (5.7) | 8.77 (10.0) | 31.79 (36.4) | | Zn, 13.13 (13.9). |
| 27 | $C_{36}H_{56}N_{10}S_{16}Zn_3$ | 32.48 (32.3) | 4.31 (4.2) | 9.77 (10.5) | 37.90 (38.3) | | Zn, 14.31 (14.7). |
| 28 | $C_{48}H_{96}N_{10}S_{16}Zn_3$ | 40.64 (37.9) | 6.77 (6.3) | 8.54 (9.2) | 30.60 (33.6) | | Zn, 12.40 (12.8). |
| 29 | $C_{48}H_{96}N_{10}S_{16}Ni_3$ | 37.79 (38.4) | 5.78 (6.4) | 8.41 (9.3) | 32.06 (34.1) | | Ni, 10.96 (11.7). |
| 30 | $C_{48}H_{96}N_{10}S_{16}Cu_3$ | 41.87 (38.0) | 6.53 (6.4) | 7.92 (9.25) | 26.60 (33.8) | | Cu, 12.29 (12.5). |
| 31 | $C_{26}H_{52}N_{10}O_2S_{16}Mn_3$ | 27.31 (25.9) | 5.00 (4.3) | 11.00 (11.5) | 38.63 (42.3) | | Mn, 11.5 (13.6). |
| 32 | $C_{24}H_{48}N_{10}S_{16}Mn_3$ | 26.8 (25.0) | 4.7 (4.2) | 11.75 (12.1) | 40.78 (44.4) | | Mn, 11.7 (14.3). |
| 33 | $C_{28}H_{56}N_{10}S_{16}Zn_3$ | 24.46 (27.1) | 4.76 (4.5) | 10.50 (11.3) | 37.91 (41.3) | | Zn, 18.2 (15.7). |
| 34 | $C_{24}H_{48}N_{10}S_{16}Cd_3$ | 23.75 (21.7) | 5.13 (3.6) | 10.68 (10.6) | 36.44 (38.6) | | Cd, 24.46 (25.4). |
| 35 | $C_{24}H_{48}N_{10}S_{16}Co_3$ | 23.75 (24.7) | 4.10 (4.1) | 10.66 (12.0) | 31.90 (44.0) | | Co, 14.20 (15.2). |
| 36 | $C_{96}H_{200}Br_2N_{12}S_{16}Zn_3$ | 48.59 (48.2) | 8.73 (8.43) | 6.84 (7.05) | 21.48 (21.45) | Br, 2.56 (6.68) | Zn, 8.06 (8.2). |
| 37 | $C_{60}H_{168}Br_2N_{12}S_{16}Zn_3$ | 44.99 (44.4) | 7.76 (7.8) | 7.52 (7.8) | 22.24 (23.6) | Br, 6.26 (7.4) | Zn, 8.29 (9.1). |
| 38 | $C_{64}H_{138}I_2N_{12}S_{16}Zn_3$ | 36.14 (37.8) | 6.59 (6.7) | 8.65 (8.3) | 24.93 (25.2) | I, 8.27 (12.5) | Zn, 10.46 (9.6). |
| 39 | $C_{56}H_{88}Cl_2N_{12}S_{16}Zn_3$ | 37.29 (39.4) | 4.86 (5.2) | 9.73 (9.8) | 30.08 (30.0) | Cl, 2.09 (4.1) | Zn, 11.46 (11.5). |
| 40 | $C_{56}H_{88}Cl_4N_{12}S_{16}Zn_4$ | 35.93 (36.4) | 4.64 (4.8) | 8.90 (9.1) | 26.74 (27.7) | Cl, 8.37 (7.7) | Zn, 14.25 (14.2). |
| 41 | $C_{48}H_{176}Br_2N_{12}S_{16}Zn_3$ | 42.36 (45.3) | 7.73 (7.97) | 6.98 (7.56) | 22.80 (23.1) | Br, 4.13 (7.2) | Zn, 12.95 (8.8). |
| 42 | $C_{60}H_{168}Br_2N_{12}S_{16}Cu_3$ | 45.55 (44.5) | 7.85 (7.8) | 8.40 (7.8) | 24.74 (23.7) | Br, 1.21 (7.4) | Cu, 10.38 (8.8). |
| 43 | $C_{60}H_{168}Br_2N_{12}S_{16}Ni_3$ | 43.71 (44.7) | 7.35 (7.8) | 8.25 (7.8) | 25.97 (23.9) | Br, 3.60 (7.4) | Ni, 8.77 (8.2). |
| 44 | $C_{28}H_{44}N_6S_8Mn$ | 38.16 (43.3) | 5.13 (5.7) | 9.45 (10.8) | 24.23 (33.1) | | Mn, 7.50 (7.09). |
| 45 | $C_{28}H_{44}N_6S_8Mn$ | 38.76 (43.3) | 5.04 (5.7) | 9.65 (10.8) | 27.96 (33.1) | | Mn, 8.51 (7.09). |
| 46 | $C_{16}H_{28}N_5S_8Fe$ | 32.03 (34.6) | 4.11 (4.5) | 9.80 (11.2) | 28.83 (41.0) | | Fe, 7.83 (8.9). |
| 47 | $C_{18}H_{28}N_5S_8Fe$ | 32.38 (34.6) | 4.41 (4.5) | 8.83 (11.2) | 30.28 (41.0) | | Fe, 7.40 (8.9). |
| 48 | $C_{80}H_{108}N_{16}P_2S_{16}Zn_3$ | 45.97 (45.3) | 7.95 (7.9) | 10.11 (10.6) | 21.80 (24.1) | P, 3.08 (2.9) | Zn, 8.69 (9.2). |
| 49 | $C_{72}H_{132}N_{12}P_2S_{16}Zn_3$ | 43.45 (44.7) | 7.02 (6.8) | 7.83 (8.7) | 19.10 (26.4) | P, 3.5 (3.2) | Zn, 9.45 (10.1). |
| 50 | $C_{82}H_{136}N_{12}P_2S_{16}Zn_3$ | 50.54 (47.9) | 6.95 (6.6) | 7.20 (8.2) | 19.35 (24.9) | P, 3.06 (3.0) | Zn, 8.20 (9.5). |
| 51 | $C_{92}H_{96}Cl_2N_8P_4S_{16}Zn_3$ | 44.56 (50.0) | 4.03 (4.3) | 5.12 (5.06) | 23.07 (23.1) | P, 5.16 (5.6); Cl, 5.52 (3.2) | Zn, 11.05 (8.1). |
| 52 | $C_{24}H_{48}N_{10}S_{16}(Mn-Zn)_3$ | 26.70 (25.0) | 4.95 (4.16) | 11.85 (12.1) | 40.79 (44.4) | | Mn, 11.1; Zn, 0.07. |
| 53 | $C_{20}H_{52}H_{10}O_2S_{16}(Mn-Zn)_3$ | 26.90 (25.9) | 4.62 (4.3) | 10.88 (11.5) | 39.00 (42.3) | | Mn, 10.5; Zn, 0.9. |
| 54 | $C_{26}H_{52}N_{10}O_2S_{16}(Ni-Zn)_3$ | 22.24 (25.6) | 3.54 (4.2) | 10.54 (11.4) | 40.24 (41.7) | | Ni, 6.91; Zn, 3.11. |

[1] Calculated values are in parentheses.

The quaternary ammonium metal chelates of the invention possess biocidal properties and in this respect are especially useful as agricultural fungicides. These biocidal preparations may be used as prepared in an essentially pure form from which water-soluble impurities have been leached or in their relatively crude form. When so used, it is usually desirable to reduce the particle size to a small diameter. A preferred range of particle size is from 0.5 to 3 microns. Surface active agents, such as wetting, dispersing and spreading agents, may be incorporated with these preparations.

The quaternary metal chelates are also valuable when disseminated as fungicidal compositions. Such compositions normally comprise an agronomically acceptable carrier having incorporated therein one or more of the quaternary metal chelates disclosed herein as the active agent or agents. By "agronomically acceptable carrier" is meant any substance which can be used to dissolve, dispense or diffuse the toxic agent to be used therein without impairing its effectiveness and which does no permanent damage to such environment as soil, equipment and agronomic crops. Where necessary, surfactants or other additives may be incorporated to give uniformly formulated mixtures.

For use as pesticides, the compounds of this invention may be taken up in an agronomically acceptable carrier or formulated so as to render them suitable for subsequent dissemination. For example, the quaternary metal chelates may be formulated as wettable powders, dusts, granular formulations, aerosols or flowable emulsion concentrates. In such formulations, the quaternary metal chelates are extended with a liquid or solid carrier and, when desired, suitable surfactants are incorporated.

Compounds of this invention may be dissolved in a water-miscible liquid such as dimethyl formamide or dimethyl sulfoxide. Such solutions are easily extended with water. Some compounds of this invention can form up to 50% solutions by weight in these solvents. Such solutions are eminently suitable for low-volume spray applications.

The quaternary metal chelates may be taken up on or mixed with a finely particled solid carrier, as for example, clays, inorganic silicates, carbonates, and silicas. Organic carriers may also be employed. Dust concentrates are commonly made wherein the quaternary metal chelates are present in the range of 20 to 80%. For ultimate application these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or a blend of these. The quaternary metal chelates are usually present in the range of 10 to 80% by weight and the surfactants in from 0.5 to 10% by weight.

Commonly used emulsifying and wetting agents include polyoxyethylated derivatives of alkylphenols, fatty alcohols, fatty acids, alkylamines, alkylarene sulfonates, and dialkyl sulfosuccinates. Spreading agents include such materials as glycerol mannitan laurate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

Flowable emulsion concentrate formulations may be made by dispersing the quaternary metal chelates of this invention into water, which may optionally contain an agronomically acceptable organic solvent, and one or more surfactants such as an emulsifying, wetting or suspending agent. A suitable organic solvent is dimethylformamide. The surfactants useful for these formulations may constitute about 0.5% to 10% by weight of the flowable emulsion concentrate and may be anionic, cationic or nonionic in character. Anionic surfactants include alcohol sulfates or sulfonates, alkylarene sulfonates and sulfosuccinates. Cationic surfactants include fatty acid alkyl amine salts and fatty acid alkyl quaternaries. Nonionic emulsifying agents include ethylene oxide adducts of alkylphenols, fatty alcohols, mercaptans and fatty acids. The concentration of the active ingredients may vary from 10 to 80%, preferably in the range of 25 to 50%.

For use as pesticides, these compounds should be applied in an effective amount sufficient to exert the desired biocidal activity by techniques well known in the art. These include conventional high-gallonage hydraulic sprays, low-gallonage sprays, airblast sprays, aerial sprays and granular and dust applications. This includes the application of the quaternary metal chelates to the loci to be protected in an effective amount either alone or when incorporated in an agronomically acceptable carrier.

Dilute sprays may be applied at concentrations of 0.05 to 20 pounds of the active ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated sprays the materials are applied as mists.

In general the compounds of the invention are exceptionally easily dispersed. For fungicides of the dithiocarbamate class, it is usually desired to use a minimum of formulation aids in order to obtain maximum active ingredient levels. Thus, the ease of dispersion of the instant product is a particularly advantageous property.

The compounds of this invention may be used as the sole pesticidal agents or they may be used in conjunction with other fungicides or with insecticides, miticides and comparable pesticides, or with plant nutrients. For example they can be used with fungicides such as dinitro(1-methylheptyl)phenyl crotonate, N-trichloromethylthio-tetrahydrophthalimide, sulfur, N-dodecylguanidine acetate, fixed coppers, fungicidal oils, and antibiotics. They can be used with insecticides, such as DDT, benzene hexachloride, phosphatics such as parathion and malathion, rotenone, lead arsenate and 1-naphthyl N-methylcarbamate, and with miticides, such as 1,1-bis(p-chlorophenyl) 2,2,2-trichloroethanol and 2,4,4′,5-tetrachlorophenyl sulfone.

Initial fungicidal evaluations of the quaternary ammonium metal chelates were derived from the standard slide spore germination test [cf. Phytopathology, 33, 627 (1943)], utilizing spores of *Alternaria solani* (Alt.), *Sclerotinia fructicola* (Scl.) and *Stemphylium sarcinaeforme* (Stem.) or *Botrytis cinerea* (Bot.). Table III exhibits the results so obtained in terms of concentration in parts per million (p.p.m.) of the test compound which effectively controlled 50% of the spores ($ED_{50}$).

TABLE III.—FUNGITOXICITIES OF ONIUM METAL CHELATES

| Example Number | Alt. | Scl. | Stm. (Bot.) |
|---|---|---|---|
| 1 | <1 | <1 | a <1 |
| 2 | 10–50 | 50–200 | 10–50 |
| 3 | <1 | <1 | a 1–10 |
| 4 | 10–50 | 200–1,000 | a 50–200 |
| 5 | >1,000 | >1,000 | >1,000 |
| 6 | <1 | <1 | 1–10 |
| 7 | <1 | 10–50 | a 10–58 |
| 8 | <1 | 10–50 | a 1–10 |
| 9 | 1–10 | 10–50 | a 1–10 |
| 10 | 1–10 | 10–50 | a 10–50 |
| 11 | <1 | 1–10 | a 1–10 |
| 12 | <1 | <1 | a <1 |
| 13 | <1 | <1 | a 1–10 |
| 14 | <1 | 1–10 | a 1–10 |
| 15 | <1 | <1 | a 1–10 |
| 16 | <1 | <1 | a 1–10 |
| 17 | <1 | <1 | a 1–10 |
| 18 | <1 | 10–50 | a 1–10 |
| 19 | <1 | 10–50 | 1–10 |
| 20 | 50–200 | 50–200 | a 50–200 |
| 21 | 50–200 | 200–1,000 | 10–50 |
| 22 | 200–1,000 | 50–200 | 200–1,000 |
| 23 | 10–50 | 50–200 | a 1–10 |
| 24 | <1 | 10–50 | <1 |
| 25 | 1–10 | 50–200 | 10–50 |
| 26 | 200–1,000 | 200–1,000 | 50–200 |
| 27 | 1–10 | 1–10 | 1–10 |
| 28 | 10–50 | 50–200 | 10–50 |
| 29 | 50–200 | >1,000 | 10–50 |
| 30 | 200–1,000 | 200–1,000 | 200–1,000 |
| 31 | 50–200 | 200–1,000 | a 200–1,000 |
| 32 | <1 | <1 | a 1–10 |
| 33 | >1,000 | >1,000 | a 10–50 |
| 34 | 10–50 | 10–50 | 10–50 |
| 35 | 200–1,000 | >1,000 | a 200–1,000 |
| 36 | 200–1,000 | 200–1,000 | 50–200 |
| 37 | 1–10 | 50–200 | 1–10 |
| 38 | 50–200 | 200–1,000 | 50–200 |
| 39 | <1 | 10–50 | 1–10 |
| 40 | <1 | <1 | a 1–10 |
| 41 | <1 | 50 | <1 |
| 42 | 50–200 | 50–200 | 10–50 |
| 43 | 10–50 | 50–200 | 10–50 |
| 44 | <1 | <1 | <1 |
| 45 | <1 | <1 | <1 |
| 46 | <1 | <1 | <1 |
| 47 | <1 | <1 | <1 |
| 48 | <1 | <1 | <1 |
| 49 | 1–10 | 50–200 | a 1–10 |
| 50 | 10–50 | 1–10 | a 1–10 |
| 51 | <1 | <1 | a 1–10 |
| 52 | <1 | <1 | a 1–10 |
| 53 | 10–50 | 10–50 | a 50–200 |
| 54 | 10–50 | >1,000 | a 10–50 | a Means that *Botrytis cinerea* was the test fungus.

As shown in the slide spore data of Table III, the onium metal chelates disclosed herein possess exceptional biocidal characteristics. Because of these properties, they have proven to be particularly valuable for the control of fungicidal diseases on agronomic crops.

Specific control of *Peronospora parasitica*, the casual agent of downy mildew on broccoli and other crucifers was exhibited by the compounds of Examples 2, 3, 18, 24, 25, 28, 30, 37 and 39. In this test, six-week old broccoli plants were sprayed with aqueous suspensions of the test chemicals, dried, then weathered in a fog chamber overnight. The dried plants were inoculated with an aqueous suspension of *Peronospora parasitica* sporangia containing 15,000 sporangia per milliliter and incubated at 53° F. for about 40 hours. Plants not treated with chemicals were included for check purposes. All plants were then placed on a greenhouse bench and stored at about 70° F. to allow disease lesions to develop and 6 to 8 days later the lesions were counted. Representative compounds of this invention gave good to excellent control of this disease.

In another greenhouse observation, several of the quaternary metal chelates were examined for their ability to control rice blast caused by *Piricularia oryzae*. In this examination, young rice plants at the 2 to 3 true leaf stage were sprayed until run-off with the test compounds dissolved in an appropriate solvent or suspended in water. After drying, the plants were placed in a fog chamber overnight. They were then removed from the fog chamber and allowed to remain on a greenhouse bench all day and night. On the third day, the plants were subjected to an artificial rain equivalent to 1½ inches in about 7 minutes. After drying, the plants were inoculated with a spore suspension of 25,000 to 30,000 conidia per ml. of *Piricularia oryzae*. Again, the plants were placed in a fog chamber overnight. Following their removal from the fog chamber, the plants were maintained in a humid environment for another day, after which time they were placed on a greenhouse bench until the disease lesions appeared. This usually occurred in about 4 to 6 days. At this point, the lesions were counted and the results compared with control plants. Those compounds described in Examples 1, 2, 12, 27, 28, 37, 39 and 40 exhibited fair to excellent control of rice blast.

Compounds of this invention, such as Example 3, have given good control of barley helminthosporium disease, *Helminthosporium teres*.

The molecular structure of the onium compounds of this invention appear to exert a considerable effect upon the fungicidal properties of these materials. For example, the onium compounds of the invention containing zinc as the sole metal ion are effective as fungicides at significantly lower dosages than for zinc ethylenebis-dithiocarbamate.

The structural formulas as given, present one depiction of the structures of this invention, but they are not necessarily the only one possible. This invention is intended to cover the products as made by the processes described irrespective of what the exact structures may be. Judging from the relatively low decomposition points of the compounds of this invention, the structures would appear to exist in a monomeric or in a low molecular weight form. The structural formulas exemplify a unit in the structure and are intended to embrace both the monomeric or polymeric structures.

We claim:
1. A bis-dithiocarbamate of the formula

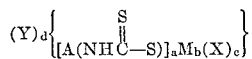

wherein A is selected from the group consisting of alkylene of 2 to 6 carbon atoms, lower alkyl-substituted alkylene of 2 to 6 carbon atoms and phenylene;

$a$ is the integer 2 or 4;

M is at least one metal selected from the group consisting of cadmium, cobalt, copper, iron, manganese, nickel and zinc;

$b$ is the integer 1, 3 or 4;

X is at least one anion which complexes with metal M;

$c$ is an integer from 0 to 4;

Y is selected from the group

wherein $R^1$, $R^2$, $R^3$ and $R^4$ represent individually alkyl of 1 to 24 carbon atoms, cyclohexyl, aryl, benzyl, alkyl substituted benzyl wherein the alkyl is 1 to 12 carbon atoms, hydroxyalkyl of 1 to 4 carbon atoms, or hydrogen except that when $R^1$, $R^2$, and $R^3$ each represent hydrogen, $R^4$ must be a group other than hydrogen or methyl; and $d$ is an integer from 1 to 4.

2. A bis-dithiocarbamate of the formula

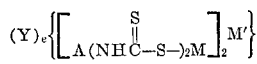

wherein A is selected from the group consisting of alkylene of 2 to 6 carbon atoms, lower alkyl-substituted alkylene of 2 to 6 carbon atoms and phenylene;

M and M' are at least one metal selected from the group consisting of cadmium, cobalt, copper, iron, manganese, nickel and zinc;

Y is a member of the group

wherein $R^1$, $R^2$, $R^3$ and $R^4$ represent individually alkyl of 1 to 24 carbon atoms, cyclohexyl, aryl, benzyl, alkyl substituted benzyl wherein the alkyl is 1 to 12 carbon atoms, hydroxyalkyl of 1 to 4 carbon atoms, or hydrogen except that when $R^1$, $R^2$, and $R^3$ each represent hydrogen, $R^4$ must be a group other than hydrogen or methyl; and $e$ is 1 or 2.

3. A bis-dithiocarbamate according to claim 2 wherein A is either ethylene or isopropylene.

4. A bis-dithiocarbamate according to claim 3 wherein Y is dimethylammonium, M and M' are zinc, and $e$ is 2.

5. A bis-dithiocarbamate according to claim 3 wherein Y is trimethylammonium, M and M' are zinc, and $e$ is 2.

6. A bis-dithiocarbamate according to claim 3 wherein Y is tetramethylammonium, M and M' are zinc, and $e$ is 2.

7. A bis-dithiocarbamate according to claim 3 wherein Y is (2-hydroxyethyl)trimethylammonium, M and M' are zinc, and $e$ is 2.

8. A bis-dithiocarbamate according to claim 3 wherein Y is ethylene-1,2-bis-ammonium, M and M' are zinc, and $e$ is 1.

9. A bis-dithiocarbamate according to claim 3 wherein Y is tetramethylammonium, M is manganous, M' is zinc, and $e$ is 2.

10. A bis-dithiocarbamate according to claim 3 wherein Y is tetra(2-hydroxyethyl)-ammonium, M and M' are zinc, and $e$ is 2

11. A bis-dithiocarbamate of the formula

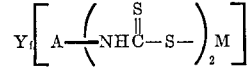

wherein Y, A and M are as defined in claim 1 and $f$ is 1 when M is trivalent and 2 when M is divalent 12. A bis-dithiocarbamate according to claim 11 wherein M is ferricor manganous.

13. A bis-dithiocarbamate according to claim 11 wherein A is ethylene or isopropylene.

14. A bis-dithiocarbamate according to claim 13 wherein Y is benzyltrimethylammonium and M is ferric.

15. A bis-dithiocarbamate according to claim 13 wherein Y is benzyltrimethylammonium and M is manganous.

16. An onium salt of a metal ion and an alkylene-bis-dithiocarbamic acid, wherein the alkylene chain has 2 to 6 carbons, and wherein the onium group is selected from the group

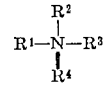

wherein $R^1$, $R^2$, $R^3$ and $R^4$ represent individually alkyl of 1 to 24 carbon atoms, cyclohexyl, aryl, benzyl, alkyl substituted benzyl wherein the alkyl is 1 to 12 carbon atoms, hydroxyalkyl of 1 to 4 carbon atoms, or hydrogen except that when $R^1$, $R^2$, and $R^3$ each represent hydrogen, $R^4$ must be a group other than hydrogen or methyl; and the metal ion is selected from the group consisting of cadmium, cobalt, copper, iron, manganese, nickel and zinc.

17. An onium salt of a metal ion and a phenylene bis-dithiocarbamic acid wherein the onium group is selected from the group

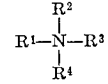

wherein $R^1$, $R^2$, $R^3$ and $R^4$ represent individually alkyl of 1 to 24 carbon atoms, cyclohexyl, aryl, benzyl, alkyl substituted benzyl wherein the alkyl is 1 to 12 carbon atoms, hydroxyalkyl of 1 to 4 carbon atoms, or hydrogen except that when $R^1$, $R^2$, and $R^3$ each represent hydrogen, $R^4$ must be a group other than hydrogen or methyl; and the metal ion is selected from the group consisting of cadmium, cobalt, copper, iron, manganese, nickel and zinc.

18. A process for preparing a bis-dithiocarbamate which comprises forming a solution of an alkali metal salt of a bis-dithiocarbamate, said salt being of the structure

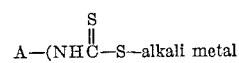

wherein A is as defined in claim 1 and a compound of the structure (Y salt) wherein Y is a quaternary ammonium salt selected from one of fluoborate, phosphate, sulfate, nitrate, and halide, and reacting with a solution of at least one halide, acetate, nitrate, phosphate and sulfate salt of the metal ions chosen from the group consisting of at least one metal selected from the group consisting of cadmium, cobalt, copper, iron, manganese, nickel and zinc, in the temperature range of 0 to 50° C.

(References on following page)

References Cited

UNITED STATES PATENTS

| | | | |
|---|---|---|---|
| 3,255,195 | 6/1966 | Benson | 260—270 |
| 3,346,605 | 10/1967 | Windel et al. | 260—429 |
| 3,285,921 | 11/1966 | Ortner et al. | 260—270 |

TOBIAS E. LEVOW, Primary Examiner

A. P. DEMERS, Assistant Examiner

U.S. Cl. X.R.

260—247, 270, 299, 429.9, 438.1, 439; 424—198, 245, 286